US 7,138,451 B2

(12) United States Patent
Witte et al.

(10) Patent No.: US 7,138,451 B2
(45) Date of Patent: Nov. 21, 2006

(54) BONDING MATERIAL SOLUTION AND THE USE THEREOF IN AN AUTOMOTIVE SPOT REPAIR KIT

(75) Inventors: Michael Witte, Ascheberg (DE); Jürgen Book, Münster (DE); Mirjana Matijevic, Münster (DE); Nadja Kaup, Münster (DE)

(73) Assignee: BASF Coatings AG, Munster (DE)

( * ) Notice: Subject to any disclaimer, the term of this patent is extended or adjusted under 35 U.S.C. 154(b) by 610 days.

(21) Appl. No.: 10/363,146

(22) PCT Filed: Sep. 4, 2001

(86) PCT No.: PCT/EP01/10146

§ 371 (c)(1),
(2), (4) Date: Apr. 1, 2003

(87) PCT Pub. No.: WO02/20680

PCT Pub. Date: Mar. 14, 2002

(65) Prior Publication Data

US 2003/0157249 A1  Aug. 21, 2003

(30) Foreign Application Priority Data

Sep. 6, 2000  (DE) ............... 100 43 810

(51) Int. Cl.
C08K 5/101 (2006.01)
C08K 5/05 (2006.01)
B05D 1/02 (2006.01)
B05D 3/00 (2006.01)
B05B 7/00 (2006.01)

(52) U.S. Cl. .............. 524/315; 524/317; 524/379; 118/300; 427/427.4; 427/372.2

(58) Field of Classification Search ........... 524/315, 524/379
See application file for complete search history.

(56) References Cited

U.S. PATENT DOCUMENTS

| 2,537,018 | A |  | 1/1951 | Barrett .................... 260/17 |
| 4,246,382 | A |  | 1/1981 | Honda et al. ............... 526/79 |
| 4,489,135 | A |  | 12/1984 | Drexler et al. ............ 428/423 |
| 4,794,147 | A |  | 12/1988 | Savino et al. ............. 525/440 |
| 4,851,460 | A |  | 7/1989 | Stranghöner et al. ...... 523/407 |
| 4,880,867 | A |  | 11/1989 | Gobel et al. .............. 524/507 |
| 4,895,910 | A |  | 1/1990 | Isozaki et al. ........... 525/326.5 |
| 4,914,148 | A |  | 4/1990 | Hille et al. ............... 524/507 |
| 4,945,128 | A |  | 7/1990 | Hille et al. ............... 524/591 |
| 5,075,372 | A |  | 12/1991 | Hille et al. ............... 524/839 |
| 5,079,312 | A |  | 1/1992 | Isozaki et al. ............. 525/479 |
| 5,169,719 | A |  | 12/1992 | Balatan .................. 428/423.1 |
| 5,210,154 | A |  | 5/1993 | Weidemeier et al. ....... 525/438 |
| 5,224,420 | A |  | 7/1993 | Schneider ................. 101/138 |
| 5,236,995 | A |  | 8/1993 | Salatin et al. ............. 524/591 |
| 5,342,882 | A |  | 8/1994 | Göbel et al. .............. 524/832 |
| 5,368,944 | A |  | 11/1994 | Hartung et al. ........... 428/423.1 |
| 5,370,910 | A |  | 12/1994 | Hille et al. .............. 427/407.1 |
| 5,376,457 | A |  | 12/1994 | Smith ...................... 428/457 |
| 5,385,656 | A |  | 1/1995 | Doebler et al. ........... 204/181.1 |
| 5,389,406 | A |  | 2/1995 | Doebler et al. ........... 427/407.1 |
| 5,416,136 | A |  | 5/1995 | Konzmann et al. ........ 523/414 |
| 5,447,998 | A |  | 9/1995 | Grady et al. ................ 526/65 |
| 5,512,322 | A |  | 4/1996 | Hille et al. .............. 427/407.1 |
| 5,552,496 | A |  | 9/1996 | Vogt-Birnbrich et al. ... 525/440 |
| 5,569,705 | A |  | 10/1996 | Vogt-Birnbrich et al. ... 525/591 |
| 5,571,861 | A |  | 11/1996 | Klein et al. ............... 524/591 |
| 5,576,386 | A |  | 11/1996 | Kempter et al. ............ 526/88 |
| 5,601,880 | A |  | 2/1997 | Scdhwarte et al. ....... 427/407.1 |
| 5,623,016 | A |  | 4/1997 | Klein et al. ............... 524/591 |
| 5,658,617 | A |  | 8/1997 | Göbel et al. ............. 427/372.2 |
| 5,691,419 | A |  | 11/1997 | Engelke et al. ............ 525/208 |
| 5,691,425 | A |  | 11/1997 | Klein et al. ............... 525/455 |
| 5,723,537 | A | * | 3/1998 | Bajorat et al. ............. 524/604 |
| 5,726,258 | A |  | 3/1998 | Fischer et al. .............. 526/64 |
| 5,761,028 | A |  | 6/1998 | Donegan et al. ........... 361/679 |
| 5,869,198 | A |  | 2/1999 | Ernie et al. ............... 428/626 |
| 5,905,132 | A |  | 5/1999 | Wegner et al. .............. 528/45 |
| 5,990,221 | A |  | 11/1999 | Dames et al. ............. 524/457 |
| 6,001,424 | A |  | 12/1999 | Lettmann ................. 427/407.1 |
| 6,160,049 | A |  | 12/2000 | Mathauer et al. .......... 524/804 |

(Continued)

FOREIGN PATENT DOCUMENTS

CA  2073814  7/1992

(Continued)

OTHER PUBLICATIONS

English Language Abstract for DE 19625773.

(Continued)

Primary Examiner—Tae H. Yoon

(57) ABSTRACT

A binder solution comprising, based on the solution,
(A) from 30 to 50% by weight of an alkyl and/or cycloalkyl acetate of 3 to 10 carbon atoms in the alkyl and/or cycloalkyl radical,
(B) from 30 to 50% by weight of an alkoxyalkyl, cycloalkoxyalkyl, alkoxycycloalkyl and/or cycloalkoxycycloalkyl acetate of 1 to 6 carbon atoms in the alkoxy and alkyl radical and of 3 to 10 carbon atoms in the cycloalkoxy and cycloalkyl radical,
(C) from 10 to 30% by weight of an alkylaromatic compound having at least two alkyl radicals of 1 to 6 carbon atoms in the molecule,
(D) from 0.01 to 1% by weight of an alcohol of 1 to 6 carbon atoms in the molecule,
(E) from 0.005 to 1% by weight of an additive, and
(F) from 0.5 to 5% by weight of an organic solution of a (meth)acrylate copolymer having a solids content, based on the solution (F), of from 50 to 90% by weight, and its use for automotive spot repair.

22 Claims, No Drawings

U.S. PATENT DOCUMENTS

| | | | |
|---|---|---|---|
| 6,221,949 B1 | 4/2001 | Gross et al. | 524/451 |
| 6,274,660 B1* | 8/2001 | Zeller et al. | 524/379 |
| 6,329,020 B1 | 12/2001 | Patzschke et al. | 427/407.1 |
| 6,372,875 B1 | 4/2002 | Mayer et al. | 528/60 |
| 6,410,646 B1 | 6/2002 | Röckrath et al. | 525/124 |
| 6,448,326 B1 | 9/2002 | Mayer et al. | 524/507 |
| 6,589,604 B1* | 7/2003 | Luettenberg | 427/407.1 |
| 2002/0131941 A1* | 9/2002 | Habeck et al. | 424/63 |

FOREIGN PATENT DOCUMENTS

| | | |
|---|---|---|
| CA | 2073115 | 1/1993 |
| CA | 2102170 | 1/1993 |
| CA | 2102169 | 11/2001 |
| CA | 2016097 | 9/2002 |
| DE | 936 468 | 7/1949 |
| GB | 2 103 638 | 7/1982 |
| WO | WO 82/02387 | 7/1982 |
| WO | WO 96/12747 | 3/1996 |
| WO | WO 97/49745 | 12/1997 |
| WO | WO 97/49747 | 12/1997 |

OTHER PUBLICATIONS

English Language Abstract for DE 19828742.
English Language Abstract for DE 4328092.
English Language Abstract for WO9426827.

* cited by examiner

BONDING MATERIAL SOLUTION AND THE USE THEREOF IN AN AUTOMOTIVE SPOT REPAIR KIT

This application is a National Phase Application of Patent Application PCT/EP01/10146 filed on 04 Sep. 2001.

The present invention further relates to the use of the novel binder solution as a spot blender for automotive spot repair (very minor repairs carried out in situ). The present invention additionally relates to a novel automotive spot repair process. The present invention relates not least to a novel device (spot repair set) for training and for the implementation of novel automotive spot repair processes.

With large-scale damage to motor vehicles, the normal procedure is to remove the damaged parts of the bodywork and refinish them over their full area. In the case of very minor damage, annoying particularly in the case of new or high-value vehicles, such as key scratches or knocks against parking lot -surrounds, however, this procedure is very laborious and not appropriate to the extent of the damage.

Minor damage is therefore preferably remedied with the aid of techniques for very small-scale automotive refinish. Among those in the art, this is also known as spot repair.

The known spot repair techniques, however, have numerous disadvantages and are difficult to carry out. In many cases, for instance, the runout zones of the clearcoat spraymist on the original finish are too wide, which makes the visual matching of refinish and original finish more difficult. Moreover, the repair clearcoat may break away or tear owing to poor adhesion of the refinish clearcoat to the original finish in the runout zones around the damage site. This produces clearly visible edges which may even run right around the refinish clearcoat that projects beyond the original finish. In that case, owing to the visually striking transition zones, the overall effect of the refinish is that of a "plaster which has been stuck on".

Attempts have been made to solve the problems of breakaway or tearing and of the difficulty of matching the optical properties in the runout zones by applying what are known as spot blenders over the uncured refinish clearcoat. The purpose of this is to produce particularly "soft" transition zones and to prevent the refinish clearcoat tearing from the original finish in the edge zones. However, the spot blenders used to date lack the process reliability necessary for spot repair, so necessitating additional work which in some cases may be considerable. Owing to these disadvantages, the known spot blenders are also unsuitable for use in inplant spot repair of original motor vehicle finishes at the premises of the automaker.

It is an object of the present invention to provide a novel binder solution suitable as a spot blender for automotive spot repair, said novel spot blender not having the disadvantages of the prior art but instead ensuring a high level of process reliability, very good flowout and very good accommodation of the spraymist droplets in the runout zones, so resulting in particularly "soft" transition zones of the refinish clearcoat. The process reliability and the optical and mechanical quality brought about by the novel spot blender should be so good that the novel spot repair processes in question are also suitable for the inplant spot repair of original automotive finishes at the automaker. Not least, the novel binder solution should be toluene-free and subject to no labelling requirements.

It is a further object of the present invention to find a novel automotive spot repair process from which the disadvantages of the prior art are absent and which instead has a high level of process reliability and ensures very good flowout and very good accommodation of spraymist droplets in the runout zones. Moreover, the refinishes produced with the aid of the novel process should have particularly "soft" transition zones to the original finish, so that they do not stand out visually from the original finish but instead are fully matched to it.

It is yet a further object of the present invention to provide a novel spot repair set which can be provided to the paintshops for purposes of training and of implementing the spot repair processes, which are known to be difficult and complex.

Accordingly, the novel binder solution has been found, which comprises, based on the solution, (A) from 30 to 50% by weight of at least one alkyl and/or cycloalkyl acetate of 3 to 10 carbon atoms in the alkyl and/or cycloalkyl radical, (B) from 30 to 50% by weight of at least one alkoxyalkyl, cycloalkoxyalkyl, alkoxycycloalkyl and/or cycloalkoxy-cycloalkyl acetate of 1 to 6 carbon atoms in the alkoxy and alkyl radical and of 3 to 10 carbon atoms in the cycloalkoxy and cycloalkyl radical, (C) from 10 to 30% by weight of at least one alkylaromatic compound having at least two alkyl radicals of at least 1 to 6 carbon atoms in the molecule, (D) from 0.01 to 1% by weight of at least one alcohol of 1 to 6 carbon atoms in the molecule, (E) from 0.005 to 1% by weight of at least one additive, and (F) from 0.5 to 5% by weight of an organic solution of at least one (meth)acrylate copolymer having a solids content, based on the solution (F), of from 50 to 90% by weight.

In the text below, the novel binder solution is referred to as the "solution of the invention" or "spot blender of the invention".

Furthermore, the novel process for automotive spot repair has been found, comprising the steps of (1) cleaning the damage site and its surroundings,
(2) sanding and recleaning the damage site,
(3) if desired, filling, sanding and cleaning the damage site,
(4) applying a filler and flashing off the resultant filler film, or alternatively curing the filler film and sanding and cleaning the resultant filler coat,
(5) applying a basecoat material to the filler film or filler coat, flashing off the resultant basecoat film, and removing any overspray,
(6) applying a clearcoat material wet-on-wet to the basecoat film,
(7) applying a spot blender, and
(8) curing the applied films, the basecoat material being applied hidingly by pneumatic application using a spray gun from the outside, i.e. from the original finish, inward, i.e. toward the center of the damage site, and the spot blender used comprising the solution of the invention.

In the text below, the novel process for automotive spot repair is referred to as the "process of the invention".

Not least, the novel spot repair set for training and for implementing the process of the invention has been developed, comprising metal case,
in the base of the case, a foam inlay with a depression in the center and two depressions symmetrically left and right thereof,
the depression in the center containing a can of the ready-to-spray solution of the invention and the two depressions left and right thereof each containing a small spray gun for implementing the process of the invention, a foam inlay in the lid of the case, containing a manual and a CD-ROM which describe the process of the invention.

In the text below, the novel spot repair set for training and for implementing the process of the invention is called the "set of the invention".

Constituent (A) of the solution of the invention is at least one, especially one, alkyl and/or cycloalkyl acetate of 3 to 10 carbon atoms in the alkyl radical and/or cycloalkyl radical. The alkyl radical preferably contains 3 to 5 carbon atoms.

Examples of suitable alkyl radicals accordingly are propyl, isopropyl, n-butyl, sec-butyl, tert-butyl, pentyl, hexyl, heptyl, octyl, nonyl and decyl radicals. Examples of suitable cycloalkyl radicals are cyclopropyl, cyclobutyl, cyclopentyl, cyclohexyl and norbornenyl radicals.

In accordance with the invention the alkyl radicals, especially propyl, isopropyl, n-butyl, sec-butyl, tertbutyl or pentyl radicals, are of advantage and are therefore used with preference. Of these, the n-butyl radicals are used with particular preference. The constituent (A) employed with particular preference is accordingly n-butyl acetate.

Constituent (A) is present in the solution of the invention in an amount, based on the solution, of from 30 to 50% by weight, preferably from 35 to 45, and in particular from 37 to 43,% by weight.

Constituent (B) of the solution of the invention is at least one, especially one, alkoxyalkyl, cycloalkoxyalkyl, alkoxycycloalkyl and/or cycloalkoxycycloalkyl acetate of 1 to 6 carbon atoms in the alkoxy and alkyl radical and of 3 to 10 carbon atoms in the cycloalkoxy and cycloalkyl radical. Preferably, the alkoxy radical contains 1 to 3 carbon atoms and the alkyl radical 2 to 4 carbon atoms.

Examples of suitable alkoxy radicals are methoxy, ethoxy, propyloxy, butoxy, pentoxy and hexoxy radicals, of which the methoxy radical is particularly advantageous and is therefore employed with particular preference.

Examples of suitable alkyl radicals are those described above, of which the propyl radical is particularly advantageous and is therefore employed with particular preference.

Examples of suitable cycloalkyl radicals are those described above, especially the cyclohexyl radical.

Examples of suitable cycloalkoxy radicals are cyclopropyl, cyclobutyl, cyclopentyl, cyclohexyl and norbornenyl radicals, especially the cyclohexyloxy radical.

In accordance with the invention, alkoxy radicals and alkyl radicals are of advantage. The constituent (B) employed with particular preference is accordingly methoxypropyl acetate, especially 1-methoxypropyl 2-acetate.

Constituent (B) is present in the solution of the invention in an amount, based on the solution, of from 30 to 50, preferably from 35 to 45, and in particular from 37 to 43,% by weight.

Constituent (C) of the solution of the invention is at least one, especially one, alkylaromatic compound having at least two, especially 2 to 3, alkyl radicals of at least 1 to 6 carbon atoms. Examples of suitable alkyl radicals are those described above. Of these, the methyl radical is particularly advantageous and is therefore used with particular preference in accordance with the invention. Examples of highly suitable alkylaromatic compounds are, therefore, o-, m- and p-xylene and also the technical-grade mixtures of these isomers, referred to collectively below as "xylene", mesitylene, pseudocumene and hemellitol, but especially xylene.

Constituent (C) is present in the solution of the invention in an amount, based on the solution, of from 10 to 30, preferably from 15 to 25, and in particular from 17 to 23,% by weight.

Constituent (D) of the solution of the invention is at least one, especially one, alcohol of 1 to 6 carbon atoms in the molecule, preferably methanol, ethanol, propanol and/or isopropanol, but especially ethanol. The ethanol may also be denatured. The denaturant; for example, may be methylethyl ketone employed in an amount of from 1 to 2% by weight, based on ethanol and methyl ethyl ketone.

Constituent (D) is present in the solution of the invention in an amount, based on the solution, of from 0.01 to 1, preferably from 0.1 to 0.4, and in particular from 0.1 to 0.3% by weight.

Constituent (E) of the solution of the invention is at least one additive. It is preferred to use additives which are known and customary in the field of coating materials. Preference is given to the use of surface-active substances such as wetting agents or leveling agents.

Examples of suitable wetting agents (E) are decalin, tetralin, siloxanes, fluorine compounds, carboxylic monoesters, phosphates, polyacrylic acids and their copolymers, or polyurethanes. For further details, reference is made to the textbook "Lackadditive" [Coatings additives] by Johan Bieleman, Wiley-VCH, Weinheim, New York, 1998, and to Römpp Lexikon Lacke und Druckfarben, Georg Thieme Verlag, Stuttgart, N.Y., 1998, page 409, "wetting agents" and page 602, "leveling-agents".

The additive is present in the solution of the invention in an amount, based on the solution, of from 0.005 to 1, preferably from 0.01 to 0.05, and in particular from 0.02 to 0.04% by weight.

Constituent (F) is at least one, especially one, organic solution of at least one, especially one, (meth)acrylate copolymer. Preference is given to the use of methacrylate -copolymers. Methacrylate copolymers employed with particular preference have a hydroxyl number >100, especially >120, mg KOH/g. The organic solution has a solids content of from 50 to 90, preferably from 55 to 85, in particular from 60 to 70,% by weight, based in each case on the solution (F).

Based in each case on their total amount, the (meth)acrylate copolymers contain in copolymerized form up to 90, preferably up to 88, more preferably up to 86, with particular preference up to 84, with very particular preference up to 82, and in particular up to 80,% by weight of hydroxyl-containing olefinically unsaturated monomers (a1).

Examples of suitable hydroxyl-containing olefinically unsaturated monomers (a1) are 2-alkylpropane-1,3-diol mono(meth)acrylates such as 2-methyl-, 2-ethyl-, 2-propyl-, 2-isopropyl- or 2-n-butyl-propane-1,3-diol mono(meth) acrylate.

Further examples of suitable hydroxyl-containing olefinically unsaturated monomers (a1) are hydroxyalkyl esters of acrylic acid, methacrylic acid or another alpha,beta-ethylenically unsaturated carboxylic acid, which (i) are derived from an alkylene glycol which is esterified with the acid, or (ii) are obtainable by reacting the acid with an alkylene oxide such as ethylene oxide or propylene oxide; especially hydroxyalkyl esters of acrylic acid, methacrylic acid, crotonic acid or ethacrylic acid, in which the hydroxyalkyl group contains up to 20 carbon atoms, such as 2-hydroxyethyl, 3-hydroxypropyl, -3-hydroxybutyl, 4-hydroxybutyl acrylate, methacrylate, ethacrylate or crotonate; 1,4-bis(hydroxymethyl)cyclohexane or octahydro-4,7-methano-1H-indenedimethanol monoacrylate, monomethacrylate, mono-ethacrylate or monocrotonate; or reaction products of cyclic esters, such as epsilon-caprolactone, for example, and these hydroxyalkyl esters; or olefinically unsaturated alcohols such as allyl alcohol; or polyols such as trimethylolpropane monoallyl or diallyl ether or pentaerythritol monoallyl, diallyl or triallyl ether. These higher-functional monomers (a1) are generally used only in minor amounts. In the context of the present invention, minor amounts of higher-functional monomers (a1) are those amounts which do not lead to crosslinking or gelling of the (meth)acrylate copolymers, unless it is intended that they should be in the form of crosslinked microgel particles.

Further suitable monomers (a1) are ethoxylated and/or propoxylated allyl alcohol, which is sold by the company Arco Chemicals, or 2-hydroxyalkyl allyl ethers, especially 2-hydroxyethyl allyl ethers. Where used, they are employed preferably not as sole monomers (a1) but instead in an amount of from 0.1 to 10% by weight, based on the (meth)acrylate copolymer.

Also suitable are reaction products of acrylic acid and/or methacrylic acid of the glycidyl ester of an alpha-branched monocarboxylic acid of 5 to 18 carbon atoms per molecule, especially a Versatic® acid, or, instead of the reaction products, an equivalent amount of acrylic acid and/or methacrylic acid which is then reacted during or after the polymerization reaction with the glycidyl ester of an alpha-branched monocarboxylic acid of 5 to 18 carbon atoms per molecule, especially a Versatic® acid (cf. Römpp, opp. cit., "Versatic® acids", pages 605 and 606).

Furthermore, the (meth)acrylate copolymers include further olefinically unsaturated monomers (a2) whose proportion is at least 10, preferably at least 12, more preferably at least 14, with particular preference at least 16, with very particular preference at least 18, and in particular at least 20,% by weight.

Examples of suitable monomers (a2) are

Monomers (a21):

(Meth)acrylic esters which are essentially free from acid groups, such as (meth)acrylic alkyl or cycloalkyl esters having up to 20 carbon atoms in the alkyl radical, especially methyl, ethyl, propyl, n-butyl, sec-butyl, tert-butyl, hexyl, ethylhexyl, stearyl and lauryl acrylate or methacrylate; cycloaliphatic (meth)acrylic esters, especially cyclohexyl, isobornyl, dicyclopentadienyl, octahydro-4,7-methano-1H-indene-methanol or tert-butylcyclohexyl (meth)acrylate; (meth)acrylic oxaalkyl or oxacycloalkyl esters such as ethyltriglycol (meth)acrylate and methoxybligoglycol (meth)acrylate having a molecular weight Mn of preferably 550 dalton or other ethoxylated and/or propoxylated, hydroxyl-free (meth)acrylic acid derivatives: (further examples of suitable monomers (a2) of this kind are known from the laid-open specification DE 196 25 773 A 1, column 3, line 65 to column 4, line 20). In minor amounts these may contain higher-functional (meth)acrylic alkyl or cycloalkyl esters such, as ethylene glycol, propylene glycol, diethylene glycol, dipropylene glycol, butylene glycol, 1,5-pentanediol, 1,6-hexanediol, octahydro-4,7-methano-1H-indenedimethanol or cyclohexane-1,2-, -1,3- or -1,4diol di(meth)acrylate; trimethylolpropane-di- or -tri(meth)acrylate; or pentaerythritol di-, tri- or tetra(meth)acrylate. As far as the amounts of higher-functional monomers (a21) are concerned, the comments made above with respect to the monomers (a2) apply.

Monomers (a22):

Ethylenically unsaturated monomers carrying at least one acid group, preferably a carboxyl group, per molecule, or a mixture of such monomers. As component (a22) it is particularly preferred to use acrylic acid and/or methacrylic acid. However, it is also possible to use other ethylenically unsaturated carboxylic acids having up to 6 carbon atoms in the molecule. Examples of such acids are ethacrylic acid, crotonic acid, maleic acid, fumaric acid and itaconic acid. It is also possible to use ethylenically unsaturated sulfonic or phosphonic acids, or their partial esters, as component (a22). Further suitable monomers (a22) are maleic acid mono (meth)acryloyloxyethyl ester, succinic acid mono(meth) acryloyloxyethyl ester and phthalic acid mono(meth)acryloyloxyethyl ester, and also vinylbenzoic acid; (all isomers), alpha-methylvinylbenzoic acid (all isomers) or vinylbenzenesulfonic acid (all isomers) Further examples of acid-group-containing monomers (a22) are known from the laid-open specification DE 196 25 773 A 1, column 2, line 58 to column 3, line 8, or from International Patent Application WO 98/49205, page 3, lines 23 to 34.

Monomers (a23):

Vinyl esters of alpha-branched monocarboxylic acids having 5 to 18 carbon atoms in the molecule. The branched monocarboxylic acids may be obtained by reacting formic acid or carbon monoxide and water with olefins in the presence of a liquid, strongly acidic catalyst; the olefins may be cracking products of paraffinic hydrocarbons, such as mineral oil fractions, and may comprise both branched and straight-chain acyclic and/or cycloaliphatic olefins. The reaction of such olefins with formic acid or with carbon monoxide and water produces a mixture of carboxylic acids in which the carboxyl groups are located predominantly on a quaternary carbon atom. Other olefinic starting materials are, for example, propylene trimer, propylene tetramer and diisobutylene. Alternatively, the vinyl esters may be prepared in a conventional manner from the acids; for example, by reacting the acid with acetylene. Particular preference, owing to their ready availability, is given to the use of vinyl esters of saturated aliphatic monocarboxylic acids having 9 to 11 carbon atoms which are branched on the alpha carbon atom.

Monomers (a24):

N,N-Diethylamino-alpha-methylstyrene (all isomers), N,N-diethylaminostyrene (all isomers), allylamine, crotylamine, 2-amino- or 2-N-methyl-, 2-N,N-dimethyl-, 2-N-ethyl-, 2-N,N-diethyl-, 2-N-propyl-, 2-N,N-dipropyl-, 2-N-butyl-, 2-N,N-dibutyl-, 2-N-cyclohexyl or 2-N,N-cyclohexyl-methyl-amino or 2-N,N,N,N-tetramethylammonium- or 2-N,N-dimethyl-N,N-diethylammonium-, 2-tetramethylphosphonium or 2-triethylsulfonium-ethyl acrylate, -ethyl methacrylate, -propyl acrylate or -propyl methacrylate, or 3-amino-or 3-N-methyl-, 3-N,N-dimethyl-, 3-N-ethyl-, 3-N,N-diethyl-, 3-N-propyl-, 3-N,N-dipropyl-, 3-N-butyl-, 3-N,N-dibutyl-, 3-N-cyclohexyl- or 3-N,N-cyclohexylmethylamino or 3-N, N,N,N-tetramethylammonium-or 3-N,N-dimethyl-N,N-diethylammonium-, 3-tetra-methylphosphonium-or 3-triethylsulfoniumpropyl acrylate or -propyl methacrylate.

Monomers (a25):

Diarylethylenes, especially those of the general formula V:

$$R^1R^2C=CR^3R^4 \qquad (V),$$

in which the radicals $R^1$, $R^2$, $R^3$ and $R^4$ in each case independently of one another are hydrogen atoms or substituted or unsubstituted alkyl, cycloalkyl, alkylcycloalkyl, cycloalkylalkyl, aryl, alkylaryl, cycloalkylaryl, arylalkyl or arylcycloalkyl radicals, with the proviso that at least two of the variables $R^1$, $R^2$, $R^3$ and $R^4$ are substituted or unsubstituted aryl, arylalkyl or arylcycloalkyl radicals, especially substituted or unsubstituted aryl radicals. Examples of suitable alkyl radicals are methyl, ethyl, propyl, isopropyl, n-butyl, isobutyl, tert-butyl, amyl, hexyl or 2-ethylhexyl. Examples of suitable cycloalkyl radicals are cyclobutyl, cyclopentyl or cyclohexyl. Examples of suitable alkylcycloalkyl radicals are methylenecyclohexane, ethylenecyclohexane or propane-1,3-diylcyclohexane. Examples of suitable cycloalkylalkyl radicals are 2-, 3- or 4-methyl-, -ethyl-, -propyl- or -butylcyclohex-1-yl. Examples of suitable aryl radicals are phenyl, naphthyl or biphenylyl, preferably phenyl and naphthyl and especially phenyl. Examples of suitable alkyl aryl radicals are benzyl or ethylene- or propane-1,3-diylbenzene. Examples of suitable cycloalkylaryl radicals are 2-, 3- or 4-phenylcyclohex-1-yl. Examples of suitable arylalkyl radicals are 2-, 3- or 4-methyl-, -ethyl-, -propyl- or -butylphen-1-yl. Examples of suitable arylcycloalkyl radicals are 2-, 3- or 4-cyclohexylphen-1-yl. The aryl radicals $R^1$, $R^2$, $R^3$ and/or $R^4$ are preferably phenyl or naphthyl radicals, especially phenyl radicals. The substituents that may be present in the radicals $R^1$, $R^2$, $R^3$ and/or $R^4$ are electron withdrawing or electron donating atoms or organic radicals, especially halogen atoms, nitrile, nitro, partially or fully halogenated alkyl, cycloalkyl, alkylcycloalkyl, cycloalkylalkyl, aryl, alkylaryl, cycloalkylaryl, arylalkyl and arylcycloalkyl radicals; aryloxy, alkyloxy and cycloalkyloxy radicals; arylthio, alkylthio and cycloalkylthio radicals and/or primary, secondary and/or tertiary amino groups. Diphenylethylene, dinaphthaleneethylene, cis- or trans-stilbene, vinylidene-bis(4-N,N-dimethylaminobenzene), vinylidene-bis(4-aminobenzene) or vinylidene-bis(4-nitrobenzene), especially diphenylethylene (DPE), are particularly advantageous and so are used with preference. In the context of the present invention, the monomers (a25) are used in order to regulate the copolymerization advantageously such that batchwise free-radical copolymerization is also possible.

Monomers (a26):
Cyclic and/or acyclic olefins such as ethylene, propylene, but-1-ene, pent-1-ene, hex-1-ene, cyclohexene, cyclopentene, norbornene, butadiene, isoprene, cyclopentadiene and/or dicyclopentadiene.

Monomers (a27):
Amido-containing monomers such as (meth)acrylamides such as (meth)acrylamide, N-methyl-, N,N-dimethyl-, N-ethyl-, N,N-diethyl-, N-propyl-, N,N-dipropyl-, N-butyl-, N,N-dibutyl-, N-cyclohexyl-, N,N-cyclohexylmethyl- and/or N-methylol-, N,N-dimethylol-, N-methoxymethyl-, N,N-di(methoxymethyl)-, N-ethoxymethyl- and/or N,N-di(ethoxyethyl)-(meth)acrylamide; monomers containing carbamate groups, such as (meth)acryloyloxyethyl carbamate or (meth)acryloyloxypropyl carbamate; or monomers containing urea groups, such as ureidoacrylate or ureidomethacrylate.

Monomers (a28):
Monomers containing epoxide groups, such as the glycidyl ester of acrylic acid, methacrylic acid, ethacrylic acid, crotonic acid, maleic acid, fumaric acid and/or itaconic acid.

Monomers (a29):
Vinylaromatic hydrocarbons such as styrene, vinyltoluene, diphenylethylene or alpha-alkylstyrenes, especially alpha-methylstyrene.

Monomers (a210):
Nitriles such as acrylonitrile and/or methacrylonitrile.

Monomers (a211):
Vinyl compounds, especially vinyl halides and/or vinylidene dihalides, such as vinyl chloride, vinyl fluoride, vinylidene dichloride or vinylidene difluoride; N-vinyl amides such as vinyl-N-methylformamide, N-vinylcaprolactam or N-vinylpyrrolidone; 1-vinylimidazole; vinyl ethers such as ethyl vinyl ether, n-propyl vinyl ether, isopropyl vinyl ether, n-butyl vinyl ether, isobutyl vinyl ether and/or vinyl cyclohexyl ether; and/or vinyl esters such as vinyl acetate, vinyl propionate, vinyl butyrate, vinyl pivalate and/or the vinyl ester of 2-methyl2-ethylheptanoic acid.

Monomers (a212):
Allyl compounds, especially allyl ethers and allyl esters such as allyl methyl, ethyl, propyl or butyl ether or allyl acetate, propionate or butyrate.

Monomers (a213)
Polysiloxane macromonomers having a number-average molecular weight Mn of from 1000 to 40,000 and having on average from 0.5 to 2.5 ethylenically unsaturated double bonds per molecule; especially polysiloxane macromonomers having a number-average molecular weight Mn of from 2000 to 20,000, with particular preference from 2500 to. 10,000, and in particular from 3000 to 7000 and having on average from 0.5 to 2.5, preferably 5 from 0.5 to 1.5, ethylenically unsaturated double bonds per molecule, as are described in DE 38 07 571 A 1 on pages 5 to 7, in DE 37 06 095 A 1 in columns 3 to 7, in EP 0 358 153 B 1 on pages 3 to 6, in U.S. Pat. No. 4,754,014 A 1 in columns 5 to 9, in DE 44 21 823 A 1 or in International Patent Application WO 92/22615 on page 12, line 18 to page 18, line 10.

Monomers (a214):
Acryloxysilane-containing vinyl monomers, preparable by reacting hydroxy-functional silanes with epichlorohydrin and subsequently reacting the reaction product with (meth)acrylic acid and/or hydroxyalkyl esters and/or hydroxycycloalkyl esters of (meth)acrylic acid and/or further hydroxyl-containing monomers (a2).

Particularly preferred monomers (a2) are the monomers (a21), (a22) and (a29).

The methacrylate copolymer solutions for use in accordance with the invention are standard commercial products and are sold, for example, by the company BASF Coatings AG under the tradename Glasurit® Racing Clear 923-144.

The preparation of the (meth)acrylate copolymers for use in accordance with the invention has no special features as to its process but instead takes place with the aid of the methods, customary and known in the polymers field, of continuous or batchwise free-radically initiated copolymerization in bulk, solution, emulsion, miniemulsion or microemulsion under atmospheric or superatmospheric pressure in stirred vessels, autoclaves, tube reactors, loop reactors or Taylor reactors at temperatures from 50 to 200° C.

Examples of suitable copolymerization techniques are described in patent applications DE 197 09 465 A 1, DE 197 09 476 A 1, DE 28 48 906 A 1, DE 195 24 182 A 1, DE 198 28 742 A 1, DE 196 28 143 A 1, DE 196 28 142 A 1, EP 0 554 783 A 1, WO 95/27742, WO 82/02387 and WO 98/02466.

Examples of suitable free-radical initiators are dialkyl peroxides, such as di-tert-butyl peroxide or dicumyl peroxide; hydroperoxides, such as cumene hydroperoxide or tert-butyl hydroperoxide; peresters,such as tert-butyl. perbenzoate, tert-butyl perpivalate, tert-butyl per-3,5,5-trimethylhexanoate or tert-butyl per-2-ethylhexanoate; peroxodicarbonates; potassium, sodium or ammonium peroxodisulfate; azo initiators, examples being azodinitriles such as azobisisobutyronitrile; C-C-cleaving initiators such as benzopinacol silyl ethers; or a combination of a nonoxidizing initiator with hydrogen peroxide. It is also possible to use combinations of the above-described initiators.

Further examples of suitable initiators are described in German Patent Application DE 196 28 142 A 1, page 3, line 49 to page 4, line 6.

It is preferred to add comparatively large amounts of free-radical initiator, the fraction of the initiator in the reaction mixture, based in each case on the total amount of the monomers (a) and of the initiator, being with particular preference from 0.2 to 20% by weight, with very particular preference from 0.5 to 15% by weight, and in particular from 1.0 to 12% by weight.

It is additionally possible to use thiocarbonylthio compounds or mercaptans such as dodecyl mercaptan as chain transfer agents or molecular weight regulators.

The organic solution (F) is present in the solution of the invention in an amount, based on the solution of the invention, of from 0.5 to 5, preferably from 1 to 4, and in particular from 2 to 3,% by weight.

A particularly advantageous solution of the invention comprises
  39% by weight butyl acetate (from 98 to 100% pure),
  38.77% by weight 1-methoxypropyl 2-acetate,
  19.5% by weight xylene,
  0.2% by weight ethanol (denatured with 1% by weight methyl ethyl ketone),
  0.03% by weight leveling gent containing siloxane groups, and
  2.5% by weight methacrylate copolymer solution with a solids content of 65% by weight.

The spot blender of the invention is free from toluene and is not subject to any labeling requirement.

The preparation of the solution of the invention has no special features as to its method but instead takes place by mixing the constituents in an appropriate stirring vessel.

The solution of the invention is used as a spot blender in the process of the invention.

The process of the invention comprises the following steps:
(1) cleaning the damage site and its surroundings,
(2) sanding and recleaning the damage site,
(3) if desired, filling, sanding and cleaning the damage site,
(4) applying a filler and flashing off the resultant filler film, or alternatively curing the filler film and sanding and cleaning the resultant filler coat,
(5) applying a basecoat material to the filler film or filler coat, flashing off the resultant basecoat film, and removing any overspray,
(6) applying a clearcoat material wet-on-wet to the basecoat film,
(7) applying a spot blender, and
(8) curing the applied films.

For the process of the invention it is essential that the basecoat material is applied hidingly by pneumatic application with a spray gun from the outside, i.e. from the original finish, inward, i.e. toward the center of the damage site. It is further essential that the spot blender used comprises the solution of the invention described in detail above.

For the pneumatic application of the coating materials it is possible per se to use customary and known spray guns. In accordance with the invention, however, it is of advantage to use smaller spray guns than the customary and known spray guns. Small-size spray guns of this kind are available from the company SATA, Kornwestheim, under the tradename SATA minijet 2 HVLP SR (spot repair).

For the cleaning and sanding it is possible to use the cleaning equipment and cleaning fluids and the sanding and/or polishing equipment that is normally used for automotive refinishing.

For filling it is possible to employ customary and known knifing fillers such as those from the company Sikkens.

Suitable fillers are customary and known, aqueous and conventional fillers, as described, for example, in patents and patent applications U.S. Pat. No. 4,537,926 A, EP 0 529 335 A 1, EP 0 595 186 A 1, EP 0 639 660 A 1, DE 44 38 504 A 1, DE 43 37 961 A 1, WO 89/10387, U.S. Pat. No. 4,450,200 A, U.S. Pat. No. 4,614,683 A and WO 94/26827.

The fillers are standard commercial products, which are sold, for example, by the company BASF Coatings AG under the brand name Glasurit® Wasserfüller 70-71 or 1K-Grundfüller 76-71.

Examples of suitable conventional and aqueous basecoat materials are known from patent applications EP 0 089 497 A 1, EP 0 256 540 A 1, EP 0 260 447 A 1, EP 0 297 576 A 1, WO 96/12747, EP 0 523 610 A 1, EP 0 228 003 A 1, EP 0 397 806 A 1, EP 0 574 417 A 1, EP 0 531 510 A 1, EP 0 581 211 A 1, EP 0 708 788 A 1, EP 0 593 454 A 1, DE-A-43 28 092 A 1, EP 0 299 148 A 1, EP 0 394 737 A 1, EP 0 590 484 A 1, EP 0 234 362 A 1, EP 0 234 361 A 1, EP 0 543 817 A 1, WO 95/14721, EP 0 521 928 A 1, EP 0 522 420 A 1, EP 0 522 419 A 1, EP 0 649 865 A 1, EP 0 536 712 A 1, EP 0 596 460 A 1, EP 0 596 461 A 1, EP 0 584 818 A 1, EP 0 669 356 A 1, EP 0 634 431 A 1, EP 0 678 536 A 1, EP 0 354 261 A 1, EP 0 424 705 A 1, WO 97/49745, WO 97/49747, EP 0 401 565 A 1 and EP 0 817 684, column 5, lines 31 to 45. It is also possible to use the basecoat materials on the basis of the mixer system described in European Patent Application EP 0 578 645 A 1.

The basecoat materials are standard commercial products which are sold, for example, by the company BASF Coatings AG under the brand names Glasurit® topcoat series 55 with Glasurit® standardizing additive 352-91 or Glasurit® topcoat series 90 with Glasurit® standardizing additive 93-E 3 and Glasurit® blender 90-M5 in accordance with European Patent Application. EP 0 578 645 A 1.

As clearcoat materials it is possible to use all customary and known two-component clearcoats based on standard commercial hydroxyl-containing binders, such as those described above, for example Glasurit® Racing-Clear 923-144, and polyisocyanates such as Glasurit® MS hardener 929-71 (both from the company BASF Coatings AG).

The curing of the applied coating materials likewise has no special methods but takes place using customary and known equipment such as radiant heaters which use near or far infrared light, or fan heaters.

The process of the invention is particularly suitable for the spot repair of damaged areas up to 3 cm in diameter. The damage site should be without deformations such as dents, scratches or stone chips. Spot repair on vertical surfaces is particularly advisable. In the case of horizontal surfaces, the process of the invention is advantageously employed in the vicinity of edges (distance up to 15 cm).

The process of the invention makes it possible to reduce sanding and/or polishing times by more than 50% as compared with conventional techniques. It gives refinishes which do not stand out visually from the. original finish. Tearing or breakaway of the repair clearcoat in the runout zones is no longer observed. The quality of the refinishes is such that they may also be used for in-plant automotive spot repair of original finishes. Because of the high pass rate, considerable economic advantages are achieved.

In order to facilitate training and the implementation of the process of the invention for paintshop users or in-plant users at the automaker, the set of the invention is provided. The set of the invention comprises:

a metal case and/or a scratch-resistant stable plastic,
in the base of the case, a foam inlay with a depression in the center and two depressions symmetrically left and right thereof,
the depression in the center containing a can, preferably a 0.5 l can, of the ready-to-spray solution of the invention and
the two depressions left and right thereof each containing a small spray gun, especially the small-sized spray gun SATA minijet 2 HVLP SR from SATA, Kornwestheim, for implementing the process of the invention,
a foam inlay in the lid of the case, containing
a manual and a CD-ROM which describe the process of the invention in detail.

Furthermore, the set of the invention may also include a recommendation list for other products and apparatus, as commonly used in automotive refinishing.

The dimensions of the case are such that the spray guns and the can may be presented attractively and eyecatchingly without close confinement. Furthermore, the inlays and the depressions are designed such that the can, the spray guns, the manual and the CD-ROM are securely housed. By virtue of the set of the invention, the skilled worker is presented in compact form with all of the technical information and apparatus which he or she needs for training and: for; implementing the process of the invention. This greatly facilitates the introduction of the process of the invention into practice, so that within the paintshop there are also no safety problems affecting its introduction and implementation.

EXAMPLES

Example 1

The Preparation of a Solution of the Invention

A solution of the invention was prepared by mixing the following constituents:

39 parts by weight butyl acetate (from 98 to 100% pure),
38.77 parts by weight 1-methoxypropyl 2-acetate,
19.5 parts by weight xylene,
0.2 parts by weight ethanol (denatured with 1% by weight methyl ethyl ketone),
0.03 parts by weight leveling agent containing siloxane groups (Baysilon® OL 44; 100% pure), and
2.5 parts by weight methacrylate copolymer solution made from hydroxypropyl methacrylate, butyl methacrylate, styrene, methacrylic acid and methyl methacrylate in butyl acetate (98 to 100% pure) and Solvesso® 100 (solids content: 65% by weight) (Glasurit® Racing Clear 923-144)

The solution was outstandingly suitable as a spot blender.

Example 2

Automotive Spot Repair to the Bumper of a Nissan Almera

The damage site was a 4 to 5 cm long scratch in the rear bumper which had been caused by a key and which in part extended down to the substrate. The equipment, materials and steps employed were as follows.

Cleaning:
1. Spray can with Teroson intensive screen cleaner
2. Finish control spray 55535 from 3M
3. Spray flask with nitro diluent M600 from Akzo
4. Kimberley Clark Classic cleaning cloths Sanding:
Sander
Sanding pad P 1500 from 3M Filling:
Knifing filler from Sikkens in the combination filler tube
Flash-off time: 10 minutes/20° C.
Sanding: wet (spray flask) with sanding pad P 1000 from 3M Masking Off:
Paper and masking tape from 3M Basecoat:
Glasurit® topcoat series 55-NIS AV3 from BASF Coatings AG with red pearl effect
Spray gun: SATA minijet green (1.0 NR); spray pressure: 1.5 bar
Damage site sprayed hidingly from the outside toward the center and running out extensively into the area
Flashing off: two to three minutes Clearcoat:
Glasurit® clearcoat 923-155 comprising Glasurit® Racing Clear 923-144, Glasurit® MS hardener 929-71 and Glasurit® standardizing additive 352-91 (mixing ratio: 2:1 +10%)
Spray gun: SATA minijet NR 2000
Damage site sprayed running out over the -end face of the bumper Spot Blender of Example 1:
Spray gun: SATA minijet NR 2000
Damage site sprayed over the runout zones of the clearcoat in the region of the left-hand and right-hand corner of the bumper Drying:
Infrared emitter, 20 minutes, 50% of maximum intensity Polishing:
No polishing needed
After this, even without polishing, the damage site had been outstandingly matched to the original finish, both optically and mechanically.

Example 3

Automotive Spot Repair to the Fender of a Nissan Almera

The damage site was a scratch on the front left-hand fender above the wheel arch. The equipment, materials and steps employed were as follows.

Cleaning:
Glasurit® cleaner 700-1 spray bottle
Kimberley Clark Classic cleaning cloths and Hamach dust-binding cloth Sanding:
Wet (spray bottle) with touch-and-close-backed sandpaper from the Nissan UK OEM coating line (SIA P1500)
Surface check with the fingers Filling:
    Knifing filler from Sikkens, in the combination filler tube
    Flash-off time: 10 minutes/20° C.

Sanding:
    Wet (spray bottle) with touch-and-close-backed sandpaper from the Nissan UK OEM coating line (SIA P1500)
    Surface check with the fingers
    Dry with Scotch-Brite gray Masking Off:
    Paper and masking tape from 3M
    Pockets and rounded, soft edges Basecoat:
    Glasurit® topcoat series 90-NIS BT3 from BASF Coatings AG with blue pearl effect
    Spray gun: SATA minijet NR 2000; spray pressure: 2 bar
    Damage site sprayed hidingly from the outside toward the center and running out extensively into the area
    Flashing off: two to three minutes Clearcoat:
    Glasurit® clearcoat 923-155 comprising Glasurit® Racing Clear 923-144, Glasurit® MS hardener 929-71 and Glasurit® standardizing additive 352-91 (mixing ratio: 10 2:1 +10%)
    Spray gun: SATA minijet NR 2000; spray pressure: 2 bar
    Damage site, sprayed running out over the end face of the bumper Spot Blender of Example 1:
    Spray gun: SATA minijet NR 2000
    Damage site sprayed left and right over the runout zones of the clearcoat Polishing:
    Drop mark is sanded (bodywork file)
    Polishing: with 09639 Finesse from 3M with air-pressure-operated polishing machine with small plate and sponge from 3M
    Polish: with 03990 Imperial from 3M by hand with polishing cloths
    After this, the damage site had been outstandingly matched to the original finish, both optically and mechanically.

The invention claimed is:

1. A binder solution comprising, based on the binder solution,
    (A) from 30 to 50% by weight of at least one member selected from the group consisting of alkyl acetate, cycloalkyl acetate, and mixtures thereof, wherein one or both of the alkyl radical or cycloalkyl radical have from 3 to 10 carbon atoms,
    (B) from 30 to 50% by weight of at least one member selected from the group consisting of alkoxyalkyl acetate, cycloalkoxyalkyl acetate, alkoxycycloalkyl acetate, cycloalkoxycycloalkyl acetate, and mixtures thereof, wherein the alkoxy radicals and the alkyl radicals have from 1 to 6 carbon atoms and the cycloalkoxy radicals and cycloalkyl radicals have from 3 to 10 carbon atoms,
    (C) from 10 to 30% by weight of at least one alkylaromatic compound having at least two alkyl radicals of 1 to 6 carbon atoms,
    (D) from 0.01 to 1% by weight of at least one alcohol of 1 to 6 carbon atoms in the molecule,
    (E) from 0.005 to 1% by weight of at least one additive, and
    (F) from 0.5 to 5% by weight of an organic solution at least one (meth)acrylate copolymer having a solids content, based on the solution (F), of from 50 to 90% by weight.

2. The binder solution of claim 1, comprising, based on the binder solution, from 35 to 45% by weight of at least one alkyl acetate (A) of 3 to 5 carbon atoms in the alkyl radical.

3. The binder solution of claim 1, comprising, based on the binder solution, from 30 to 45% by weight of at least one alkoxyalkyl acetate (B) having from 1 to 3 carbon atoms in the alkoxy radical and 2 to 4 carbon atoms in the alkyl radical.

4. The binder solution of claim 1, comprising, based on the binder solution, from 15 to 25% by weight of at least one alkylaromatic compound (C) having from 2 to 3 methyl groups in the molecule.

5. The binder solution of claim 1, comprising, based on the binder solution, from 0.1 to 0.4% by weight of an alcohol (D) selected from the group consisting of methanol, ethanol, propanol, isopropanol, and mixtures thereof.

6. The binder solution of claim 1, comprising, based on the binder solution, from 0.01 to 0.5% by weight of at least one additive (E) selected from the group consisting of welling agents.

7. The binder solution of claim 1, comprising, based on the binder solution, from 1 to 3% by weight of at least one organic solution (F) of a (meth)acrylate copolymer having a solids content, based on the solution (F), of from 60 to 70% by weight.

8. The binder solution of claim 1, wherein (A) is butyl acetate.

9. The binder solution of claim 1, wherein (B) is 1-methoxypropyl 2-acetate.

10. The binder solution of claim 1, wherein (C) is_xylene.

11. The binder solution of claim 1, wherein (D) is_ethanol.

12. The binder solution of claim 1, wherein the methacrylate copolymer has a hydroxyl number>100 mg KOH/g.

13. A method of automotive spot repair comprising applying the binder solution of claim 1 to a previously coated substrate.

14. An automotive spot repair process comprising the steps of
    (1) cleaning a damaged site and an area surrounding said site,
    (2) sanding the damaged site,
    (3) applying a filler to provide a filler film,
    (4) applying a basecoat composition to the filler film to provide a basecoat film,
    (5) applying a clearcoat composition wet-on-wet to the basecoat film to provide a clearcoat film,
    (6) applying a spot blender, and
    (7) curing the basecoat and clearcoat films, wherein the basecoat material is applied hidingly by pneumatic application with a spray gun, and said spot blender comprises the binder solution of claim 1.

15. A spot repair set comprising a case comprising a ready-to-spray container of the binder solution of claim 1 and a spray gun.

16. The process of claim 14 further comprising one or more additional steps selected from the group consisting of filling, sanding, cleaning, and mixtures thereof.

17. The process of claim 14 wherein the step of applying a filler further comprises flashing off the filler film.

18. The process of claim 14 wherein the step of applying a filler further comprises curing the filler film to provide a cured filler film.

19. The process of claim 18 further comprising sanding the cured filler film.

20. The process of claim 14 further comprising flashing off the basecoat film and removing any overspray.

21. The spot repair set of claim 15 wherein the case further comprises a foam inlay for holding one or more of the ready-to-spray container, the spray gun or the material describing the process.

22. The spot repair set of claim 15, further comprising a material describing a process, the material, selected from the group consisting of manuals, CD-ROMs, and mixtures thereof.

* * * * *